(12) United States Patent
Kou (10) Patent No.: US 9,425,950 B2
(45) Date of Patent: Aug. 23, 2016

(54) SAMPLING CLOCK ADJUSTMENT FOR AN ANALOG TO DIGITAL CONVERTER OF A RECEIVER

(71) Applicant: eTopus Technology Inc., Sunnyvale, CA (US)

(72) Inventor: Yu Kou, San Jose, CA (US)

(73) Assignee: eTopus Technology Inc., Sunnyvale, CA (US)

(\*) Notice: Subject to any disclaimer, the term of this patent is extended or adjusted under 35 U.S.C. 154(b) by 0 days.

(21) Appl. No.: 14/572,676

(22) Filed: Dec. 16, 2014

(65) Prior Publication Data

US 2016/0173271 A1 Jun. 16, 2016

(51) Int. Cl.
*H04L 7/027* (2006.01)
*H04L 7/00* (2006.01)

(52) U.S. Cl.
CPC ........... *H04L 7/0276* (2013.01); *H04L 7/0029* (2013.01); *H04L 7/0087* (2013.01)

(58) Field of Classification Search
CPC .................. G11B 20/10046; G11B 20/10037; G11B 20/10212; G11B 20/10222; G11B 20/10055; H04L 7/0054; H04L 7/0276; H04L 7/0087; H04L 7/0029
See application file for complete search history.

(56) References Cited

U.S. PATENT DOCUMENTS

| | | | |
|---|---|---|---|
| 2007/0110188 A1\* | 5/2007 | Esumi | G11B 20/10055 375/324 |
| 2010/0061490 A1\* | 3/2010 | Noeldner | H04L 1/0054 375/341 |
| 2010/0226031 A1\* | 9/2010 | Dziak | G11B 27/36 360/31 |

\* cited by examiner

*Primary Examiner* — Vineeta Panwalkar
(74) *Attorney, Agent, or Firm* — Fenwick & West LLP (57) ABSTRACT

A receiver for high speed communications. The receiver includes an analog to digital converter to convert an analog input signal into at least one digital input signal at timings controlled by a sampling clock. A finite impulse response filter generates at least one filtered input signal based on the digital input signal. A data decision circuit recovers data based on the filtered input signal. The filtered input signal and the recovered data can be provided to a feedback loop to determine a timing error of the sampling clock, which is then used to generate the sampling clock.

16 Claims, 7 Drawing Sheets

SAMPLING CLOCK ADJUSTMENT FOR AN ANALOG TO DIGITAL CONVERTER OF A RECEIVER

BACKGROUND

1. Field of the Disclosure

The present disclosure relates to a receiver and, more specifically, to a receiver having an analog to digital converter with a phase adjustable sampling clock.

2. Description of the Related Art

High speed communication systems transfer data over communication links at high data rate. The receiving devices in high speed communication systems can include analog to digital converters to convert analog signals into digital form for digital signal processing. As signaling speeds increase, the sampling phase of the analog to digital converter can have a significant effect on the receiver's ability to recover data from the analog signals.

SUMMARY

Embodiments of the present disclosure include a receiver having an analog to digital converter with a phase adjustable sampling clock. The receiver includes an analog to digital converter to convert an analog input signal into at least one digital input signal at timings controlled by a sampling clock. A finite impulse response filter generates at least one filtered input signal based on the digital input signal. A data decision circuit recovers data based on the filtered input signal. A feedback loop is coupled to receive the filtered input signal and to generate the sampling clock based on the second digital codes.

In one embodiment, the feedback loop is coupled to receive the recovered data and to generate the sampling clock further based on the recovered data. In one embodiment, the feedback loop comprises a signal reconstruction circuit to generate at least one reconstructed input signal corresponding to a reconstructed version of the filtered input signal based on the recovered data, a timing error circuit to generate at least one timing error signal indicative of a difference between the filtered input signal and the reconstructed input signal, and a clock generator to generate the sampling clock based on the timing error signal. In one embodiment, the timing error circuit generates the timing error signal to be indicative of a gradient of a difference between the filtered input signal and the reconstructed input signal.

In one embodiment, a method of operation in a receiver is disclosed. The method comprises converting an analog input signal into at least one digital input signal at timings controlled by a sampling clock using an analog to digital converter; generating at least one filtered input signal based on the digital input signal using a finite impulse response filter; recovering data based on the filtered input signal; receiving the filtered input signal at a feedback loop; and generating the sampling clock with the feedback loop based on the filtered input signal.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present disclosure can be readily understood by considering the following detailed description in conjunction with the accompanying drawings.

DETAILED DESCRIPTION OF EMBODIMENTS

The Figures (FIG.) and the following description relate to preferred embodiments of the present disclosure by way of illustration only. Reference will now be made in detail to several embodiments of the present disclosure, examples of which are illustrated in the accompanying figures. It is noted that wherever practicable similar or like reference numbers may be used in the figures and may indicate similar or like functionality. One skilled in the art will readily recognize from the following description that alternative embodiments of the structures and methods illustrated herein may be employed without departing from the principles of the disclosure described herein.

Embodiments of the present disclosure include a receiver for high speed communications having an analog to digital converter with a phase adjustable sampling clock. The receiver includes an analog to digital converter to convert an analog input signal into at least one digital input signal at timings controlled by a sampling clock. A finite impulse response filter filters the digital input signal into at least one filtered input signal. A data decision circuit recovers data based on the filtered input signal. The filtered input signal and the recovered data can be provided to a feedback loop to determine a timing error of the sampling clock, which is then used to generate the sampling clock. A phase of the sampling clock can be adjusted in this manner using the filtered input signal and the recovered data as inputs to the feedback loop to minimize the timing error and increase the accuracy of the recovered data.

Figure 1:
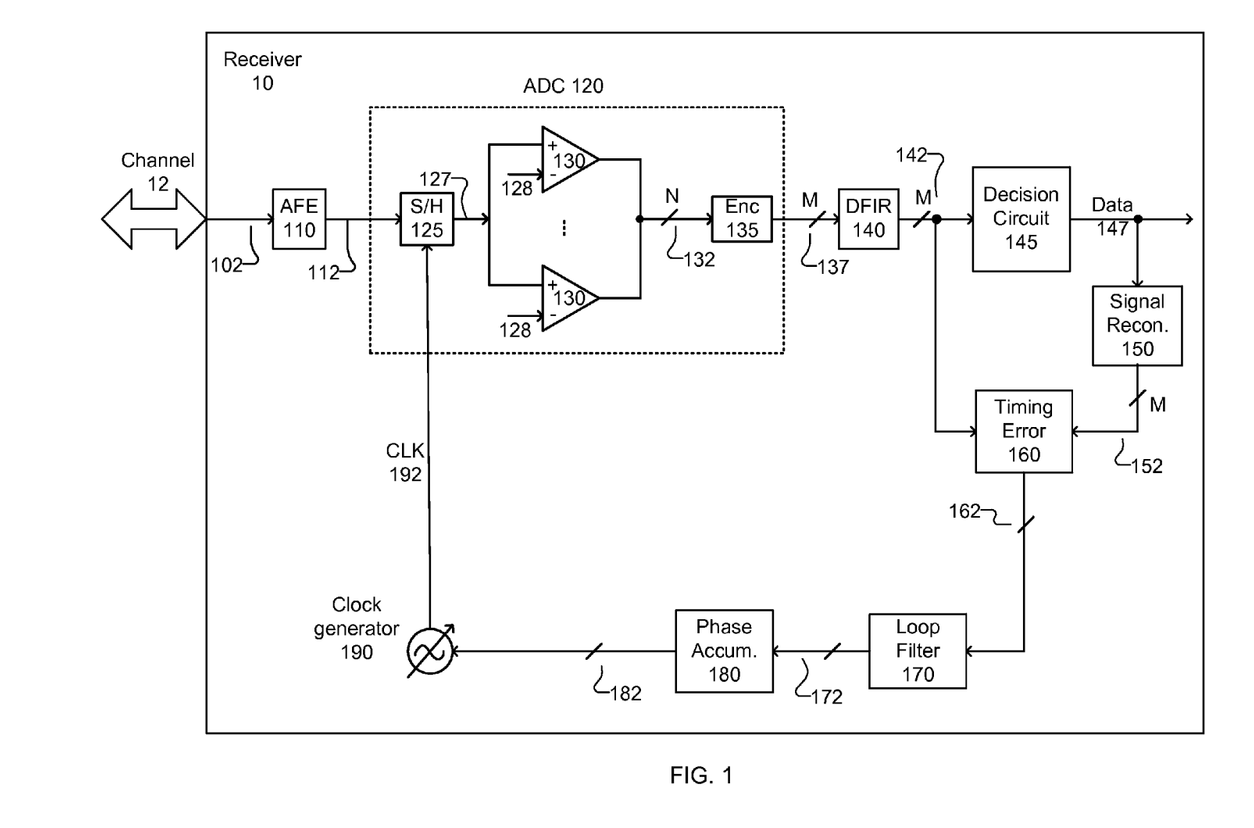
FIG. 1 is a high speed communication system that includes a receiver, according to an embodiment.

FIG. 1 is a high speed communication system that includes a receiver 10, according to an embodiment. The receiver 10 is coupled to a communications channel 12 and receives an analog channel signal 102 from a remote transmitter (not shown) through the communications channel 12. The communications channel 12 can be, for example, a copper communication channel found in a computing backplane that carries single ended or differential signals. The communications channel 12 can also be, for example, an optical communication channel that carries optical signals.

The channel signal 102 is generated at the transmitter from digital data. The receiver 10 recovers digital data 147 from the channel signal 102. In some embodiments the receiver 10 may be a standalone device or part of a larger device, such as an application specific integrated circuit (ASIC). The receiver 10 includes an analog front end (AFE) 110, an analog to digital converter (ADC) 120, a digital finite impulse response (DFIR) filter 140, a data decision circuit 145, a signal reconstruction circuit 150, a timing error circuit 160, a loop filter 170, an error accumulator, and a phase adjustable clock generator 190. Each of these components can be implemented with hardware circuits that generate signals, and the lines connecting the components carry signals from one component to the next.

The AFE 110 performs pre-processing on channel signal 102 using analog processing techniques to generate an analog input signal 112. The channel signal 102 may be non-ideal due to channel impairments, such as insertion loss, crosstalk, inter-symbol interference and optical dispersion, and the AFE 110 uses analog processing to reduce some of these non-idealities. Examples of analog processing techniques include gain adjustment or continuous time equalization filters. In other embodiments the AFE 110 may simply be an input terminal that receives the channel signal 102 and passes it on to generate the analog input signal with no signal processing The input of ADC 120 is coupled to the output of the AFE 110. The ADC 120 converts analog input signal 112 into one or more digital input signals 137 by sampling the analog input signal 112 and then rounding or quantizing the sampled input signal 112 to its closest digital value. Each digital value represents a different voltage level of the sampled input signal 112. ADC 140 includes a sample and hold circuit 125, comparator array 130 and an encoder 135.

Sample and hold circuit 125 periodically samples the voltage level of the analog input signal 112 and generates a sampled input signal 127 as a result of the sampling. Sample and hold circuit 125 may be implemented by a switch connected to a capacitor. When the switch is closed, the capacitor is charged to the voltage level of the input signal 112. When the switch is opened, the capacitor holds the voltage level that it is charged to.

The sampling phase of the sample and hold circuit 125 is controlled by pulses of a sampling clock 192. When the sampling clock 192 is logic high, the sample and hold circuit 125 samples the input signal 112. When the sampling clock 192 is low, the sample and hold circuit 125 holds the sampled value constant.

The comparator array 130 includes N comparators that perform analog to digital conversion by comparing sampled input signal 127 to N reference voltages 128. The output of the comparator array 130 is an N bit digital thermometer code 132. For example, voltage levels of the sampled input signal 127 may be converted into 4 bit thermometer codes as follows:

0V to 0.1 V→0000
0.1V to 0.2V→0001
0.2V to 0.3V→0011
0.3V to 0.4V→0111
0.4V to 0.5V→1111

The encoder circuit 135 then uses thermometer-to-binary encoding to convert the N bit thermometer code 152 into an M bit digital code in binary form. For example, a 64 bit thermometer code 132 can be converted into a 6 bit binary code using logic gates. The M bit digital code is used as the digital input signals 137.

Digital finite impulse response (DFIR) filter 140 receives the digital input signals 137 and filters the digital input signals 137 into filtered digital input signals 142 having M bit values. DFIR filter 140 is a filter whose impulse response has finite duration. The DFIR filter 140 produces filtered digital input signals 142 having values that are equal to a weighted sum of delayed values of input signals 137. The DFIR filter 140 can include a number of taps, where each tap represents a different input value of the digital input signals 137. Each tap is weighted and summed together to produce the filtered digital input signals 142. The number of taps and weights can vary depending on the tuning needs of the receiver 10.

The data decision circuit 145 receives the filtered digital input signals 142 and makes a decision on the logical data value represented by the filtered digital input signals 142, thereby recovering data 147. The recovered data 147 can be single-bit data (e.g., NRZ) or multi-bit data (e.g. PAM-4). In one embodiment, data decision circuit 145 includes a digital comparator that compares each value of filtered digital input signals 142 to a threshold value and uses the result of the comparison as the recovered data 147. In one embodiment, data decision circuit 145 is a digital signal processor (DSP) that recovers data 147 from the filtered digital input signals 142 using digital signal processing algorithms. Examples of data decision circuit 145 include adaptive equalizers, decision feedback equalizers (DFE) and a maximum likelihood sequence detector (MLSD) (e.g., a Viterbi decoder). Data decision circuit 145 may also be referred to as a data recovery circuit.

The receiver 10 also includes a feedback loop that is coupled to the outputs of the DFIR 140 and the data decision circuit 145. The feedback loop receives the filtered input signals 142 and the recovered data 147, and adjusts the phase of the sampling clock 192 using these two inputs. At high speed signaling, the sampling phase of the ADC 120 can have a substantial effect on the accuracy of data 147 recovered by the receiver 10. The feedback loop adjusts the phase of the sampling clock 192 through continuous feedback to ensure that the sampling phase is correct. As shown, the feedback loop includes a signal reconstruction circuit 150, a timing error detector 160, a loop filter 170, a phase accumulator 180 and a phase adjustable clock generator 190.

Signal reconstruction circuit 150 receives the recovered data 147 and generates reconstructed digital input signals 152 from the recovered data 147. The reconstructed input signals 152 are a reconstructed and ideal version of the filtered digital input signals 142. In other words, the reconstructed input signals 152 represent ideal signals that are expected to be input to data decision circuit 145 if the sampling phase of the ADC 120 were ideal. If the phase of sampling clock 192 were at its ideal phase and resulted in ideal samples, the reconstructed input signals 152 would match exactly with the filtered digital input signals 142. However, when the phase of sampling clock 192 is not at the ideal phase, the reconstructed input signals 152 will be different than the filtered digital input signals 142. Reconstructed input signals 152 may also be referred to as reference signals or target signals.

Timing error detector 160 receives the filtered digital input signals 142 and reconstructed input signals 152 and determines if there is a difference between the two types of signals. Timing error detector 160 generates digital timing error signals 162 that indicate the presence of a difference between the two signals. In one embodiment, timing error detector 160 is a type of minimum mean square error (MMSE) detector. The MMSE detector determines a mean square error (MSE) between the filtered digital input signals 142 and reconstructed input signals 152. The MMSE detector then computes a gradient (i.e. slope) of the MSE over time and outputs timing error signals 162 that are indicative of a gradient of the MSE relative to a phase timing error. The gradient represents a direction in which the MSE is moving and how fast the MSE is moving in that direction.

Loop filter 170 filters the timing error signals 162 into filtered digital timing error signals 170. Loop filter 170 effectively slows the response of the feedback control loop. Phase accumulator 180 receives the filtered timing error signals 172 and generates digital phase control signals 182 corresponding to a target phase of the sampling clock 192. Phase accumulator 180 adds new values of the filtered timing error signals 172 to a current phase control value. The phase control value is output through the phase control signals 182.

The clock generator 190 generates the sampling clock 192. The clock generator 190 also adjusts a phase of the sampling clock 192 in accordance with the phase control signals 182. In one embodiment, the clock generator 190 includes a phase interpolator that moves the edge of the sampling clock 192 forward or backwards. For example, if the phase control signals 182 changes from a value of "7" to "8", the clock generator 190 may move the edge of the sampling clock 192 in a direction that increases a phase delay of the sampling clock 192. The feedback loop adjusts the phase of the sampling clock 192 to reach a steady state during which the filtered timing error signals 172 have a mean value of zero.

The receiver 10 thus uses error based feedback to control the sampling phase of the ADC. Filtered digital input signals 142 and reconstructed digital input signals 152 are compared to determine whether the sampling phase should be changed. Reconstructed digital input signals 152 can also be generated to approximate the ideal value of filtered digital input signals 142 using simple circuits, whereas generating reconstructed digital input signals 152 to approximate other signals can require more complicated circuitry.

Figure 2:
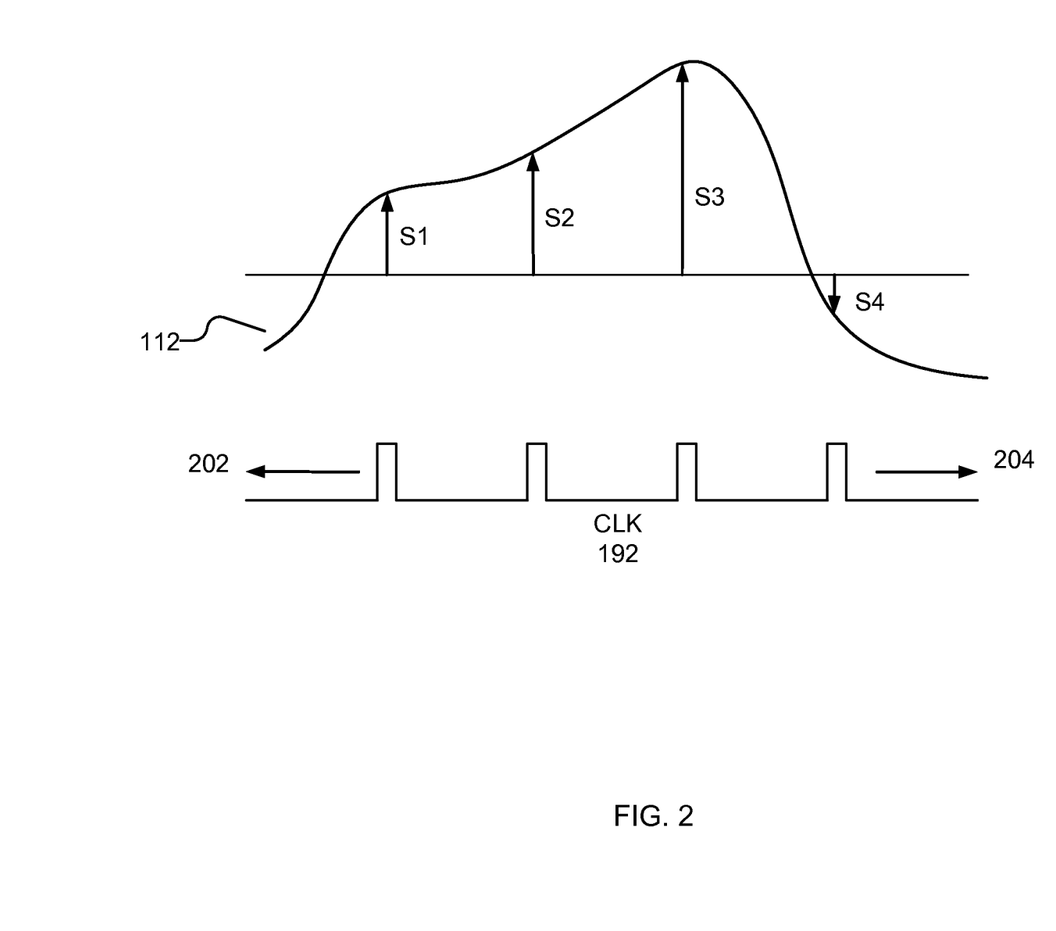
FIG. 2 illustrates sampling in the analog to digital converter in the receiver of FIG. 1, according to an embodiment.

FIG. 2 illustrates sampling in the analog to digital converter 120 in the receiver 10 of FIG. 1, according to an embodiment. FIG. 2 includes two waveforms. The top waveform is an analog input signal 112 at the input to the ADC 120. The bottom waveform is a sampling clock 192 that includes a series of periodic sampling pulses. Each time a sampling pulse occurs, the ADC 120 samples the analog input signal 112, producing a series of samples S1-S4 at different sampling times.

The phase of the sampling clock 192 may not be set to the ideal sampling phase for recovering accurate data 147. Thus, the feedback loop can shift the phase of the sampling clock 192 forwards 204 or backwards 202 by changing a delay of the sampling clock 192.

Figure 3A:
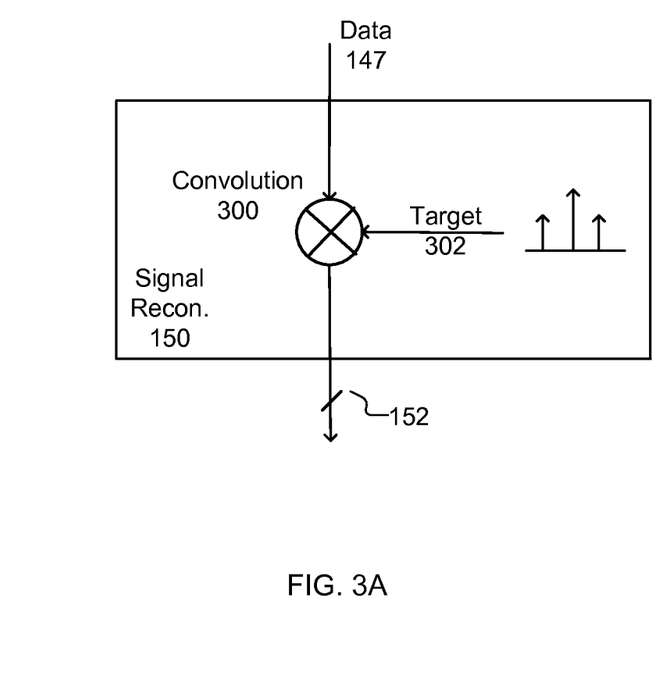
FIG. 3A is an example of a signal reconstruction circuit in the receiver of FIG. 1, according to an embodiment.

FIG. 3A is an example of a signal reconstruction circuit 150 in the receiver 10 of FIG. 1, according to an embodiment. As shown, signal reconstruction circuit 150 includes a convolution circuit 300. The convolution circuit 300 convolves a sequence of recovered data 147 with a sequence of convolution target values 302, e.g. [1 1] or [1 2 1]. The convolution target values 302 may be pre-determined values that are set based on known characteristics of the channel. Alternatively, the convolution target values 302 may be adaptive and change over time. The convolution produces digital codes that are used as the reconstructed input signals 152. Each code represents an input sample that would be captured at an ideal sampling time.

Figure 3B:
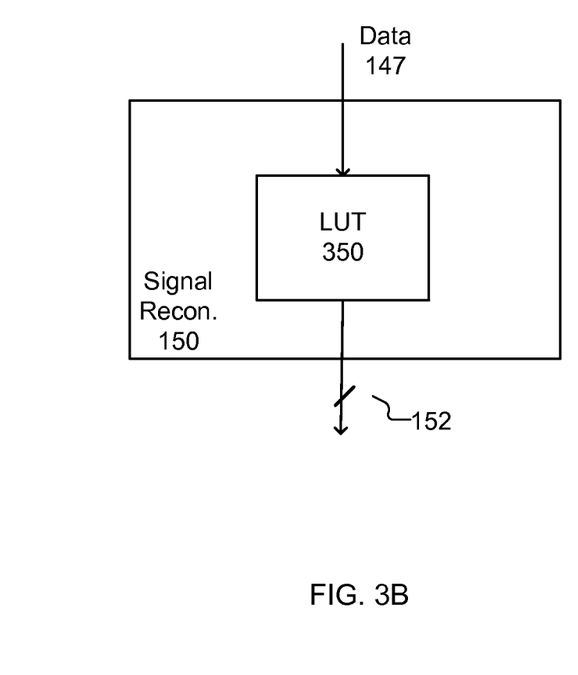
FIG. 3B is an example of a signal reconstruction circuit in the receiver of FIG. 1, according to another embodiment.

FIG. 3B is an example of a signal reconstruction circuit 150 in the receiver 10 of FIG. 1, according to another embodiment. Signal reconstruction circuit 150 can include a look up table (LUT). The LUT 350 references sequences of recovered data 147 to values of the reconstructed input signals 152. The values of the reconstructed input signals 152 in the LUT 350 may be implement a pre-computed convolution function or other type of function. For example, the LUT 350 can be programmed with values that imitate a non-linearity effect in the receiver circuitry. The recovered data 147 is provided to the LUT 350, which then outputs the appropriate values for the reconstructed input signals 152.

Figure 4:
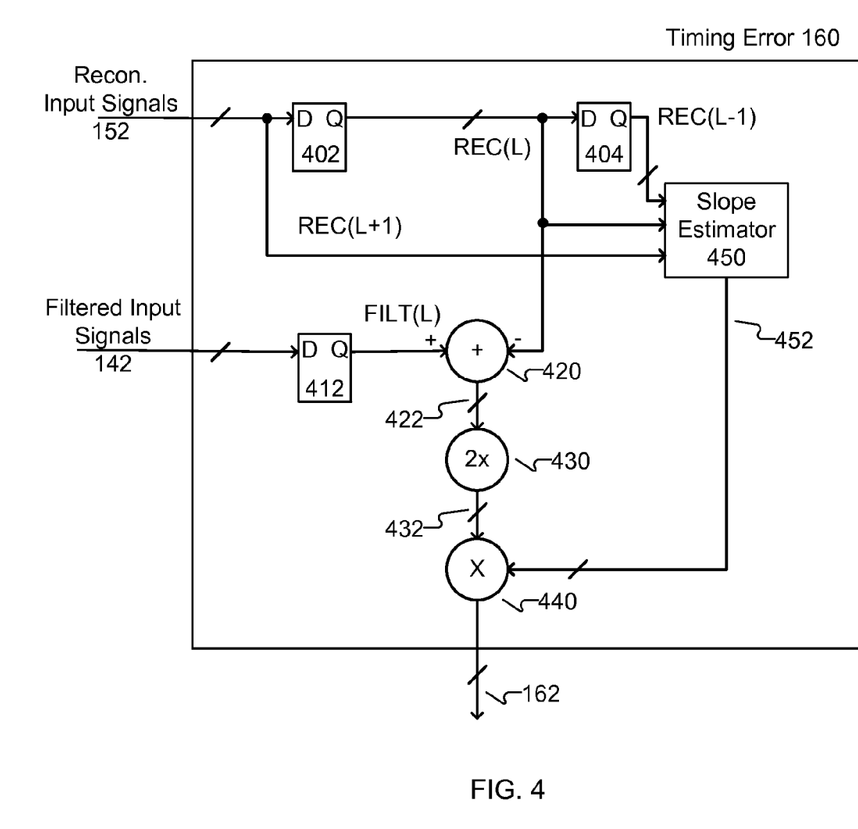
FIG. 4 is a detailed block diagram of a timing error circuit in the receiver of FIG. 1, according to one embodiment.

FIG. 4 is a detailed block diagram of a timing error circuit 160 in the receiver 10 of FIG. 1, according to one embodiment. This timing error detector 160 in FIG. 4 is a type of MSME that generates timing error signals 162 indicative of a gradient of a MSE between the filtered input signals 142 and the reconstructed input signals 152. The gradient represents a slope of the MSE, i.e. how fast the MSE is changing relative to a sampling phase timing error. In theory, the values of the timing error signals are 162 computed with the following formula:

$$TERR = \frac{dMSE}{dPERR} = 2 \times (FILT(K \times T + PERR) - RECON(K \times T)) \times \frac{dFILT(K \times T + PERR)}{dPERR}$$ (Equation 1)

Where TERR is a value of the timing error signals 162. MSE is mean square error. PERR is the sampling phase timing error. K is an integer. T is a sampling period. FILT is a value of filtered input signals 142 taken at sample time K×T+PERR. RECON is a value of the reconstructed input signals 152 corresponding to an ideal sample time of K×T.

In practice, the computation of TERR is implemented using the circuit of FIG. 4 that approximates equation EQ1. Registers 402 and 404 store reconstructed input codes REC(L) and REC(L-1). Register 412 stores a filtered input code FILT(L).

Subtractor circuit 420 subtracts reconstructed code REC(L) from filtered code FILT(L) to generate a difference code 422 that represents a difference between FILT(L) and REC(L). Multiplier circuit 430 multiplies the difference code 422 by two to generate a scaled difference code 432. Scaled difference code 432 corresponds to the first portion of equation 1, i.e. the portion of $$2 \times (FILT(K \times T + PERR) - RECON(K \times T)).$$

Slope estimator 450 receives the sequence of three reconstructed input codes REC(L+1), REC(L) and R(L-1). Slope estimator 450 generates a slope code 452 having a value that indicates whether these three signal codes represent a signal having positive, negative, or constant slope as follows:

If $REC(k+1) \geq REC(k) + \Delta$ AND $REC(k) \geq REC(k-1) + \Delta$,
    slope=+S If $REC(k+1) \leq REC(t) - \Delta$ AND $REC(k) \leq REC(k-1) - \Delta$,
    slope=-S Otherwise, slope=0

$\Delta$ is a threshold amount of slope change, and can be set to a pre-determined value. Higher levels of $\Delta$ cause the slope estimator 450 to ignore small changes in code values of the reconstructed input signals 152. S is a fixed pre-determined value. In one embodiment +S is "1" and −S is "−1". S may be increased if higher loop gain is desired, or decreased if lower loop gain is desired.

Slope code 452 is an approximation of the second part of equation 1, i.e. the portion of $$\frac{dFILT(K \times T + PERR)}{dPERR}.$$

Slope code 452 is only an approximation of equation 1 because it is computed from the reconstructed input signals 152 instead of the filtered input signals 142. Simulation results indicate this modification improves system robustness.

Multiplier circuit 440 multiples the scaled difference code 432 by the slope code 452. The output of the multiplier circuit 440 becomes the timing error signals 162 that indicate a gradient of a MSE between filtered input signals 142 and reconstructed input signals 152.

Figure 5:
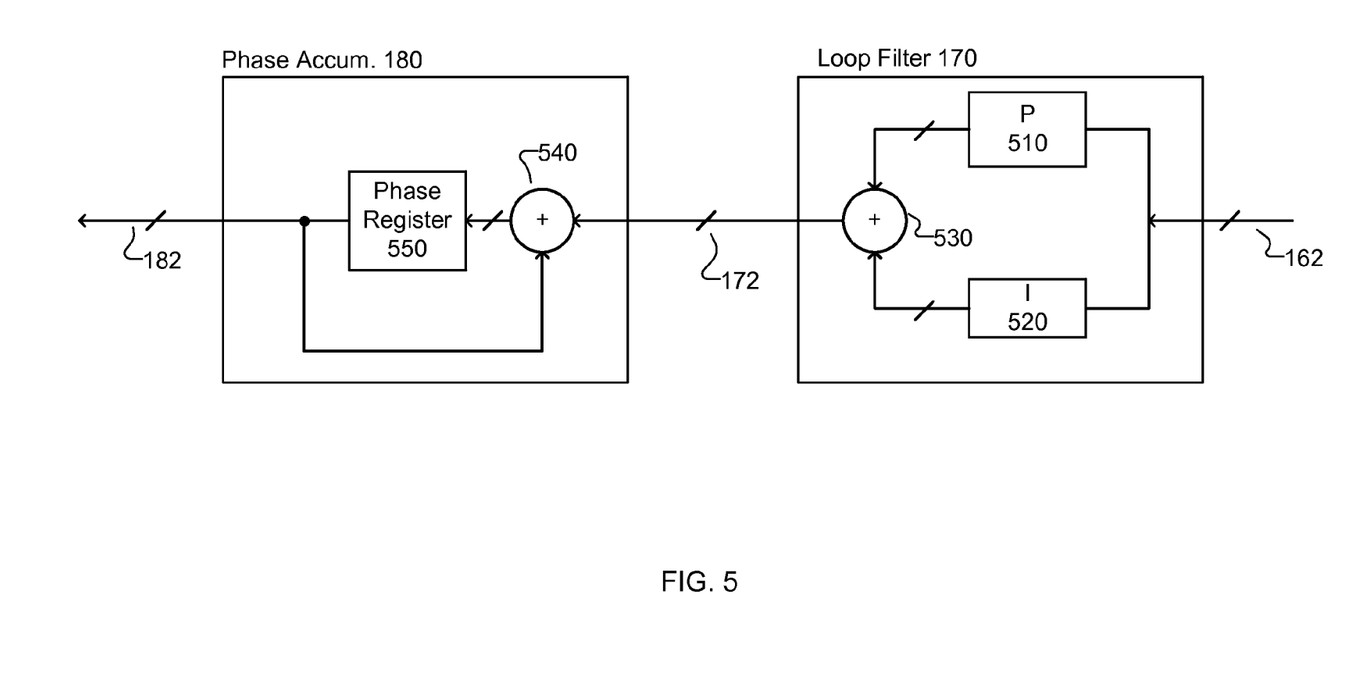
FIG. 5 is a detailed block diagram of a loop filter and error accumulator in the receiver 10 of FIG. 1, according to one embodiment.

FIG. 5 is a detailed block diagram of a loop filter 170 and error accumulator 180 in the receiver 10 of FIG. 1, according to one embodiment. Loop filter 170 is implemented as a proportional integral (PI) controller. A proportional calculation circuit 510 multiplies values of the timing error signals 162 by a constant. The integral calculation circuit 520 integrates values of the timing error signals 162. The proportional and integrated portions are summed together by adder circuit 530 to produce the filtered timing error signals 172.

Phase accumulator 180 includes an adder circuit 540 and a phase register 550. The phase register 550 stores a current phase control setting. The adder circuit 540 updates the phase control setting by adding values of the filtered timing error signals 172 to the current phase control setting. The error register 550 then outputs its stored phase control setting through the phase control signals 182 182. Thus, when the filtered timing error signals 172 have a value of "0", the current phase control setting is maintained without change.

Figure 6:
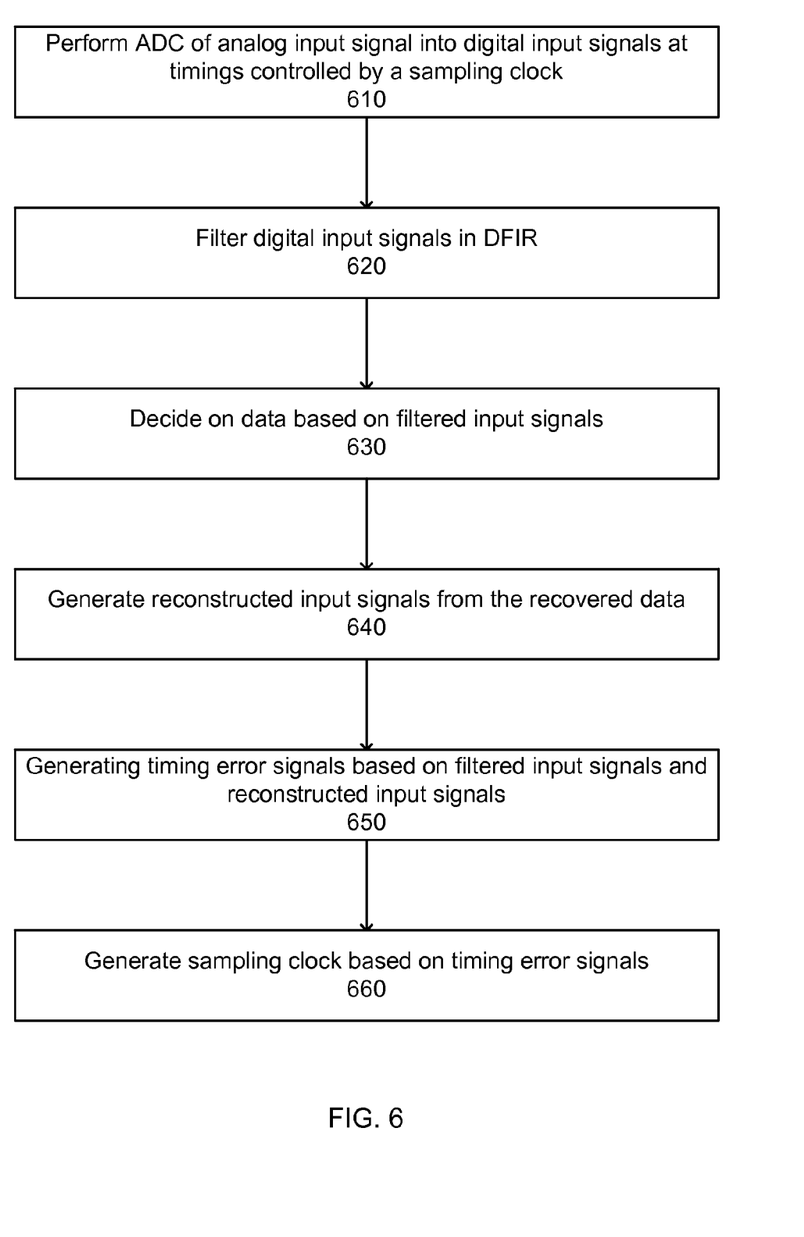
FIG. 6 is a method of operation in in the receiver of FIG. 1, according to an embodiment.

FIG. 6 is a method of operation in in the receiver 10 of FIG. 1, according to an embodiment. In step 610, the ADC 120 converts an analog input signal into digital input signals 137 using ADC conversion. The timing of the ADC 120 is controlled by a sampling clock 192. In step 620, the DFIR 140 filters digital input signals 137 into filtered input signals 142. In step 630, a decision circuit 145 decides on the data represented by the filtered input signals 142, thereby generating recovered data 147.

In step 640, signal reconstruction circuit 150 of the feedback loop generates reconstructed input signals 152 from the recovered data 147. In step 650, timing error circuit 160 of the feedback loop generates timing error signals 162 indicating a difference between the filtered input codes 142 and the recovered data 147, such as a gradient of a MSE. In step 660, the adjustable clock generator 190 of the feedback loop generates the sampling clock 192 based on the timing error signals 162 (via loop filter 170 and phase accumulator 180).

Figure 7:
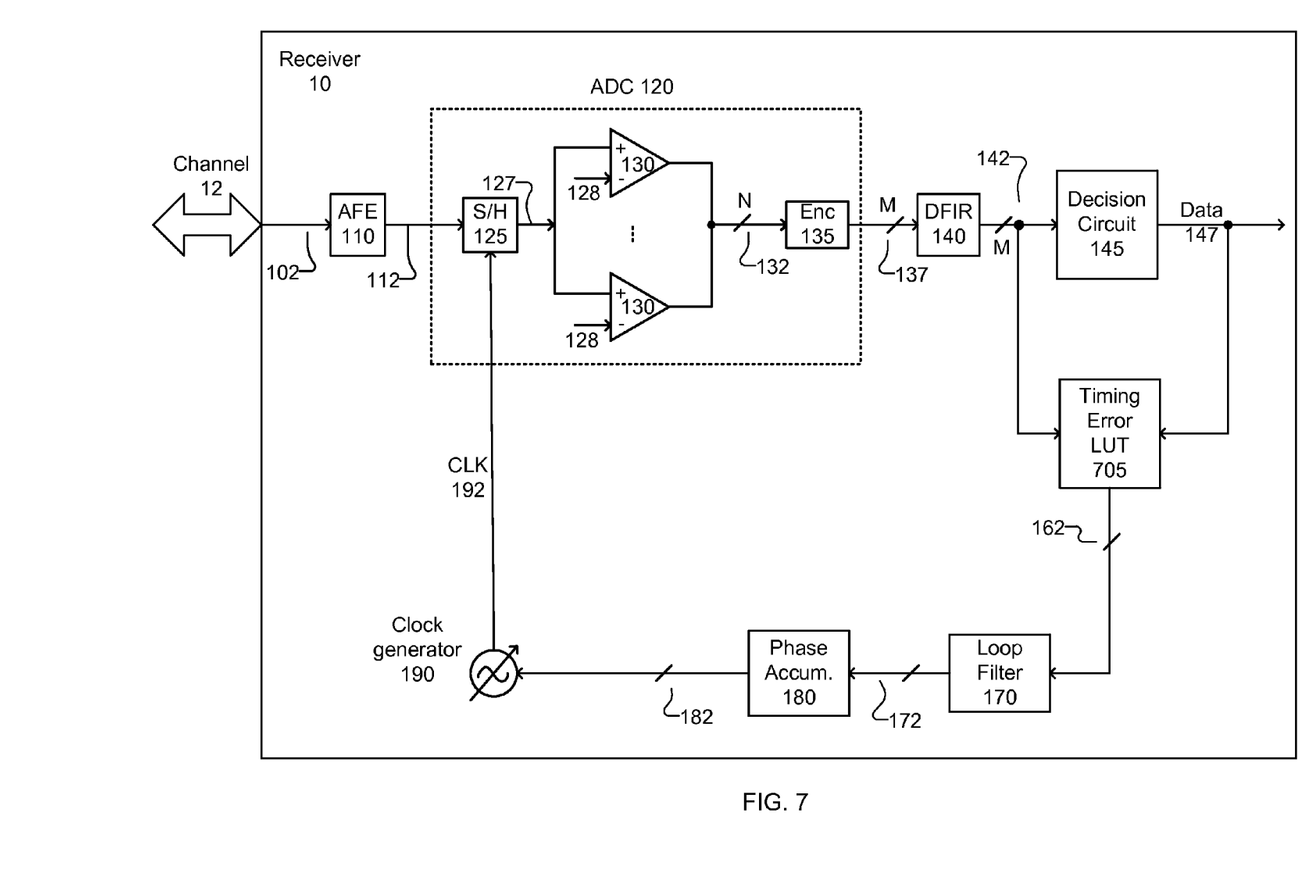
FIG. 7 is a high speed communication system that includes a receiver, according to another embodiment.

FIG. 7 is a high speed communication system that includes a receiver 10, according to another embodiment. The receiver of FIG. 7 is similar to the embodiment of FIG. 1, but now collapses the functions of the signal reconstruction circuit 150 and timing error circuit 160 into a single timing error LUT 705. The timing error LUT 705 includes mappings between the recovered data 147 and the filtered input signals 142 and a set of pre-computed timing error values. The recovered data 147 and filtered input signals 142 are provided as inputs to the timing error LUT 705, and the timing error LUT 705 outputs the appropriate timing error values associated with that input. The timing error values are used to generate the timing error signals 162.

In one embodiment, a representation of the receiver 10 or circuits within the receiver 10 may be stored as data in a non-transitory computer-readable medium (e.g. hard disk drive, flash drive, optical drive). These representations may be behavioral level, register transfer level, circuit component level, transistor level and layout geometry-level descriptions.

Upon reading this disclosure, those of ordinary skill in the art will appreciate still additional alternative structural and functional designs for a receiver having an ADC with an adjustable sampling clock through the disclosed principles of the present disclosure. Thus, while particular embodiments and applications of the present disclosure have been illustrated and described, it is to be understood that the disclosure is not limited to the precise construction and components disclosed herein. Various modifications, changes and variations which will be apparent to those skilled in the art may be made in the arrangement, operation and details of the method and apparatus of the present disclosure disclosed herein without departing from the spirit and scope of the disclosure as defined in the appended claims.

What is claimed is:

1. A receiver comprising:
    an analog to digital converter to convert an analog input signal into at least one digital input signal at timings controlled by a sampling clock;
    a finite impulse response filter to generate at least one filtered input signal based on the at least one digital input signal;
    a data decision circuit to generate recovered data based on the at least one filtered input signal; and
    a feedback loop coupled to receive the at least one filtered input signal and to receive the recovered data and to generate the sampling clock based on the at least one filtered input signal and the recovered data, the feedback loop comprising:
        a signal reconstruction circuit to generate at least one reconstructed input signal corresponding to a reconstructed version of the at least one filtered input signal based on the recovered data; and
        a timing error circuit to generate at least one timing error signal indicative of a difference between the at least one filtered input signal and the at least one reconstructed input signal; and
        a clock generator circuit to generate the sampling clock based on the at least one timing error signal.

2. The receiver of claim 1, wherein the signal reconstruction circuit comprises a convolution circuit to generate the at least one reconstructed input signal by convolving the recovered data with target values.

3. The receiver of claim 1, wherein the signal reconstruction circuit includes a look up table that references the recovered data to values of the at least one reconstructed input signal.

4. The receiver of claim 1, wherein the timing error circuit generates the at least one timing error signal to be indicative of a gradient of a difference between the at least one filtered input signal and the at least one reconstructed input signal.

5. The receiver of claim 4, wherein the timing error circuit comprises a minimum mean square estimator (MSME).

6. The receiver of claim 4, wherein the timing error circuit generates at least one slope signal indicative of a slope of the at least one reconstructed input signal based on the at least one reconstructed input signal and generates the at least one timing error signal based on the at least one slope signal.

7. The receiver of claim 1, wherein the feedback loop further comprises:
   a loop filter circuit to filter the at least one timing error signal into at least one filtered timing error signal; and
   a phase accumulator circuit to accumulate values of the at least one filtered timing error signal into at least one phase control signal,
   wherein the clock generator adjusts a phase of the sampling clock based on the at least one phase control signal.

8. The receiver of claim 1, wherein the clock generator circuit adjusts a phase of the sampling clock based on the at least one timing error signal.

9. A receiver comprising:
   an analog to digital converter to convert an analog input signal into at least one digital input signal at timings controlled by a sampling clock;
   a finite impulse response filter to generate at least one filtered input signal based on the at least one digital input signal;
   a data decision circuit to generate recovered data based on the at least one filtered input signal; and
   a feedback loop coupled to receive the at least one filtered input signal and to generate the sampling clock based on the at least one filtered input signal, the feedback loop comprising:
      a timing error look up table that references the at least one filtered input signal and the recovered data to values for at least one timing error signal; and
      a clock generator to generate the sampling clock based on the at least one timing error signal.

10. A method of operation in a receiver, the method comprising:
    converting an analog input signal into at least one digital input signal at timings controlled by a sampling clock;
    generating at least one filtered input signal based on the at least one digital input signal using a finite impulse response filter;
    generating recovered data based on the at least one filtered input signal;
    receiving the at least one filtered input signal and the recovered data at a feedback loop;
    generating the sampling clock with the feedback loop based on the at least one filtered input signal and the recovered data, wherein generating the sampling clock comprises:
       generating at least one reconstructed input signal corresponding to a reconstructed version of the at least one filtered input signal based on the recovered data; and
       generating at least one timing error signal indicative of a difference between the at least one filtered input signal and the at least one reconstructed input signal; and
       generating the sampling clock based on the at least one timing error signal.

11. The method of claim 10, wherein generating the at least one reconstructed input signal comprises convolving the recovered data with target values.

12. The method of claim 10, wherein the at least one timing error signal is generated to be indicative of a gradient of a difference between the at least one filtered input signal and the at least one reconstructed input signal.

13. The method of claim 12, wherein generating the at least one timing error signal comprises generating at least one slope signal indicative of a slope of the at least one reconstructed input signal based on the at least one reconstructed input signal, and wherein generating the at least one timing error signal is based on the at least one slope signal.

14. The method of claim 10, wherein generating the sampling clock based on the at least one timing error signal comprises:
    filtering the at least one timing error signal into at least one filtered timing error signal;
    accumulating values of the at least one filtered timing error signal into at least one phase control signal,
    adjusting a phase of the sampling clock based on the at least one phase control signal.

15. The method of claim 10, wherein generating the sampling clock based on the at least one timing error signal comprises adjusting a phase of the sampling clock based on the at least one timing error signal.

16. The method of claim 10, wherein generating the at least one reconstructed input signal comprises looking up values in a look up table that references the recovered data to values of the at least one reconstructed input signal.

* * * * *